United States Patent [19]
Cheung

[11] Patent Number: 5,372,511
[45] Date of Patent: Dec. 13, 1994

[54] EDUCATIONAL TOYS

[75] Inventor: Wing K. Cheung, Singapore, Singapore

[73] Assignee: Tectron Manufacturing (HK) Limited, Hong Kong, Hong Kong

[21] Appl. No.: 979,921

[22] Filed: Nov. 23, 1992

[30] Foreign Application Priority Data

Jan. 13, 1992 [GB] United Kingdom ............... 9200643

[51] Int. Cl.⁵ .............................................. A63F 9/10
[52] U.S. Cl. .................................. 434/345; 434/327; 434/333
[58] Field of Search ................. 434/345, 333–335, 434/343, 193, 200–202; 446/297, 397

[56] References Cited

U.S. PATENT DOCUMENTS

| | | | |
|---|---|---|---|
| 4,348,191 | 9/1982 | Lipsitz et al. | 446/297 X |
| 4,820,233 | 4/1989 | Weiner | 446/397 X |
| 4,968,255 | 11/1990 | Lee et al. | 434/335 X |
| 5,087,043 | 2/1992 | Billings et al. | 434/333 |
| 5,167,508 | 12/1992 | McTaggart | 434/317 |

FOREIGN PATENT DOCUMENTS 2210722 6/1989 United Kingdom .

OTHER PUBLICATIONS

Patent Application Ser. No. 07/867,921, filed Apr. 13, 1992.

*Primary Examiner*—Richard J. Apley
*Assistant Examiner*—Glenn E. Richman
*Attorney, Agent, or Firm*—Rosenman & Colin

[57] ABSTRACT

An educational toy is disclosed which includes a sensor having an array of sensing points and a sensor sheet having a flexible face against which an object whose shape is to be recognized is placed, the object providing a change in electrical characteristics at points of the array which are contacted by the object, an output for detecting points whose electrical characteristics have been altered, a memory for comparing the relative positions of the points in such an array with information stored in memory to determine to which of the memorized set of objects the changed characteristics correspond and providing an output in a child recognizable manner associated with the shape placed on the sensor sheet.

17 Claims, 3 Drawing Sheets

EDUCATIONAL TOYS

BACKGROUND AND FIELD OF THE INVENTION

This invention relates to educational or learning toys whose objective is to help young children learn whilst playing.

Many such toys are known and it is the object of the present invention to provide a toy which assists young children to recognise shapes, whether of letters of the alphabet, numerals or objects.

SUMMARY OF THE INVENTION

According to the invention in a first aspect, there is provided an educational toy comprising a sensor having an array of sensing points and a sensor sheet having a flexible face against which an object whose shape is to be recognised is placed, the object providing a change in electrical characteristics at points of the array which are contacted by the object, output means for detecting points whose electrical characteristics have been altered, memory means for comparing the relative positions of the points in such an array with information stored in memory to determine to which of the memorised set of objects the changed characteristics correspond and means for providing an output in a child recognisable manner which corresponds to the shape placed on the sensor sheet.

According to the invention an educational toy comprises: a sensor having a matrix of aligned columns and rows of sensing points, a sensor sheet having a flexible front face against which a two dimensional object whose shape is to be recognised is placed, the shape of the object providing a change in electrical characteristics of a characteristic array of the points of the matrix which are covered by the object, output means for detecting the array of points whose electrical characteristics have been altered for a particular object in contact with the sheet, memory means for comparing the relative positions of the points in such an array with characteristics stored in memory to determine which of a memorized set of objects the changed characters correspond and providing an output according to the corresponding shape, and means for providing an output in a child recognisable manner which corresponds to the shape placed on the sensor sheet.

Thus one can preprogramme into the memory the pattern of a characteristic array corresponding to a particular shape of those sensing points in the matrix which will be electrically altered by a particular shape and when such an array is noted, irrespective of its orientation or position on the sensor sheet, the toy can determine the particular shape placed on the sensor simply by comparing the characteristic array of altered points with what is preprogrammed into the memory. As an added refinement it is possible to take new shapes, place them on the sensor and the characteristic array from the sensor for a new shape can then be entered into memory for future recognition so as to add a further refinement to the toy and enable the child to extend the play value of the toy by programming it to recognise additional shapes over and above those which are initially preprogrammed into the unit.

The sorts of shapes which can be recognised include letters of the alphabet and numerals so that a child could for example learn to spell words correctly by building up a word from individual letters on the sensor screen or could learn simple arithmetic by making up simple additions, multiplications and so on, on the sensor and have to provide an answer also on the sensor which the toy can then check. In addition for younger children it may well be desirable to provide a number of two dimensional shaped objects such as pictures of animals or everyday household objects which the child either has to recognise or for which the toy will provide a voice output describing the object such as the word dog when the shape of a dog is placed on the sensor.

The toy may function for younger children simply by providing an output such as the voice output noted above when a shape is placed on the sensor. Alternatively the toy may set a child a problem such as ask the child to press a button corresponding to a particular shape or enter the name of an object such as the letters DOG if a dog-shaped object is placed on the sensor. Then the toy will compare the child's entry against the shape which is recognised and perhaps congratulate the child or provide say an output corresponding to the shape if the child has not chosen correctly.

As a further possibility when for example a dog shape is placed on the sensor block the output could be either a voice synthesized output of the word dog or could be the sound output of a dog barking or both.

In all circumstances the toy has good educational and play value since a large number of shapes can be preprogrammed into the memory and so there are numerous possibilities for a child to play and learn words and the names of objects as well as learning to spell or do simple arithmetic.

In one embodiment of the invention the matrix sensor comprises a flexible outer layer carrying a large number of parallel rows or columns of conductive stripes and an inner sheet also carrying a large number of parallel conductive stripes crossed with respect to those of the outer layer, and sandwiched between the two a spacer sheet having openings corresponding to the crossing points of the conductive stripes, whereby the placing of a shape on the outer flexible sheet will depress selected areas of the outer sheet such that it will be distorted through the openings so that selected stripes on the outer and inner sheets will come into electrical contact. Then, clock means can be provided to cycle through the columns and rows of lines to determine which crossing points are in contact and the points noted to compare with preset memory to determine a particular object. As an alternative to a change in conduction at the crossing points caused by the presence of an object on the sensor one can on the alternative check say for a change in capacitance at those points without the two crossing lines actually coming into electrical contact.

The sensor can determine a large number of points whose electrical characteristics have been changed corresponding to the total shape of the object placed on the sensor. However in a preferred embodiment each object has a discreet number of feet extending rearwardly from its rear and it is these feet which come into contact with the sensor rather than whole shape and their relative positions which are determined to discriminate one object from another. There may, for example, be three such feet and the characterising orientation of the three feet relative one another can be used to provide an output which the preprogrammed memory will recognise as corresponding to that object. This greatly simplifies the data to De held in memory since it is not necessary to store in memory the total shape of the object but merely the positions of the three characteristic feet for that object. They could De Of course more or less than three feet projecting rearwardly from any particular object.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 1:
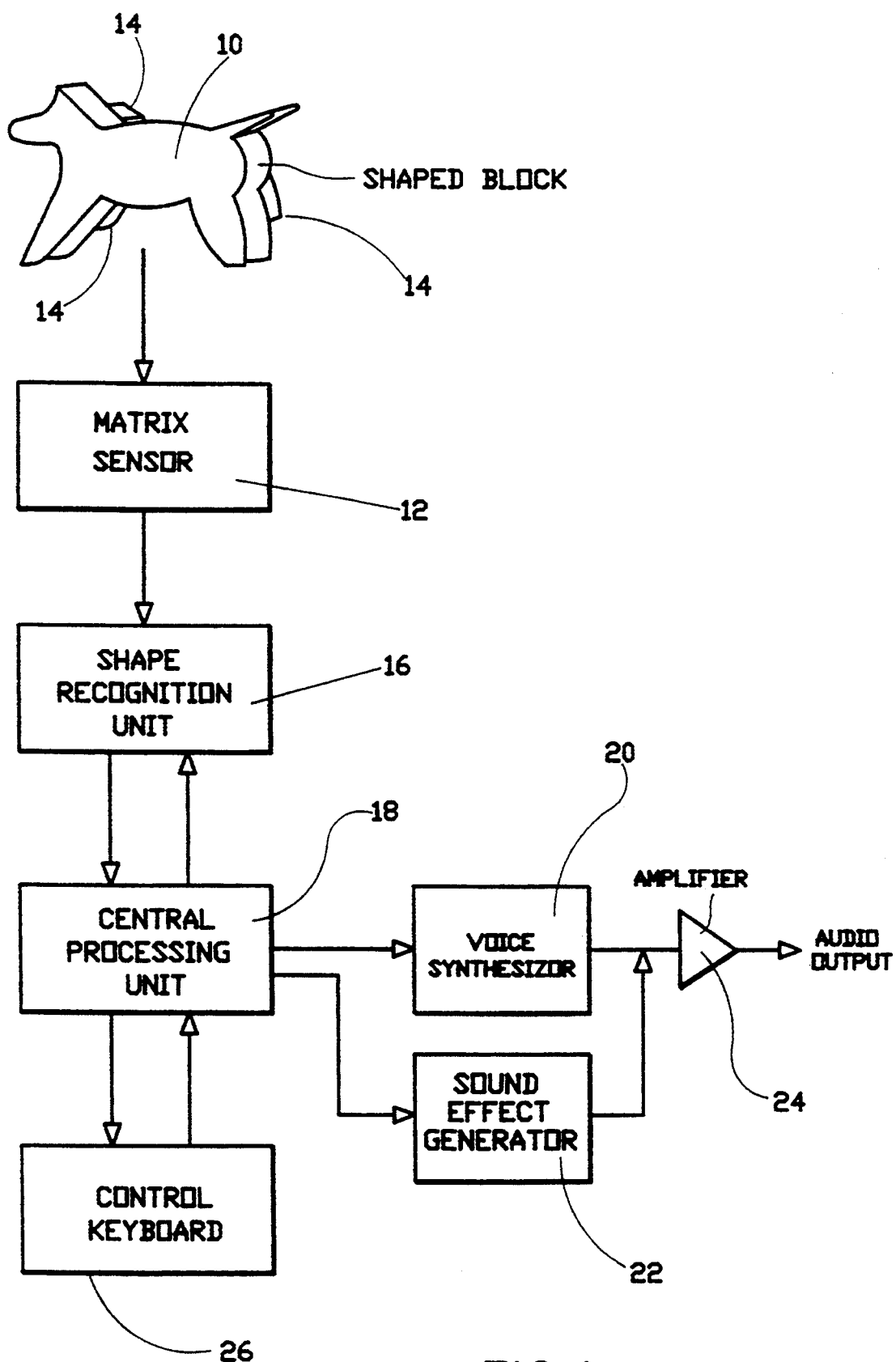
FIG. 1 is a flow diagram showing the basic components of a toy according to an embodiment of the invention.

As best shown in FIG. 1, a shaped block 10 such as the shape of a dog is placed on the matrix sensor 12 of the toy. As will be described this provides a number of electrical connections at crossing points on the sensor. The block 10 has three feet 14 which project rearwardly from the block and it is the feet which contact the sensor 12. The relative positions of the three feet are different for each different block 10 and the relative positions of the feet of a block are characteristic of that block and that block alone.

The shape recognition unit 16 interrogate the sensor 12 to determine the relative positions of the feet 14 and its output is controlled by the central processing unit (cpu) 18 to check in memory for a corresponding preprogrammed set of relative positions. When found, this is recognised as a particular shape, e.g. the shape of a dog, and the cpu 18 provides an output to a voice synthesizer 20 and/or to a sound effect generator 22. These will then generate the word "Dog" and a barking noise, respectively, and their outputs pass through an amplifier 24 to a speaker (not shown).

A control keyboard 26 can also be provided to control the cpu 18, e.g. to activate the unit, to cause the interrogation of the unit 16 and so on.

Figure 2:
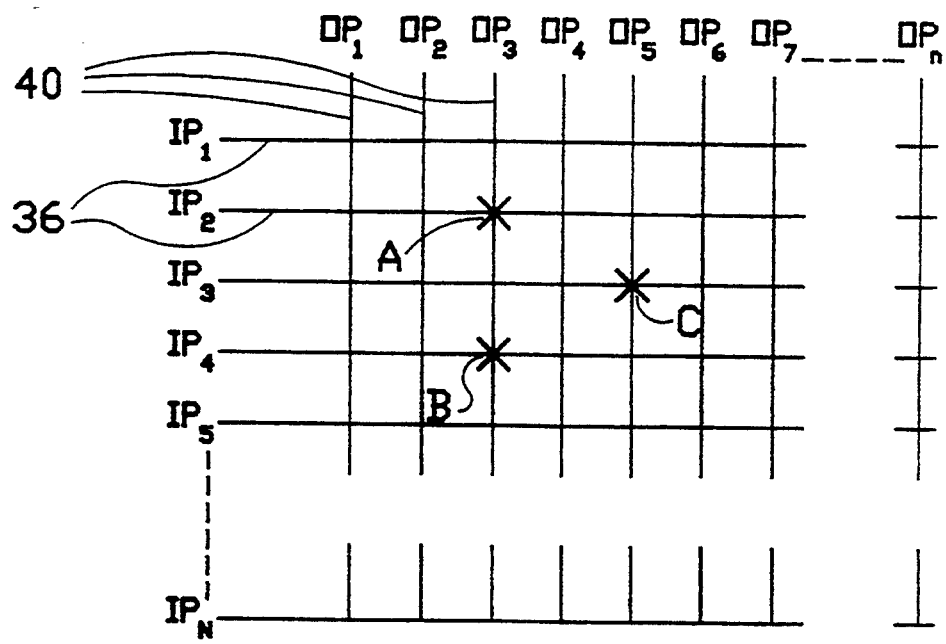
FIG. 2 is a diagram of the electrical connections in the sensor.
Figure 3:
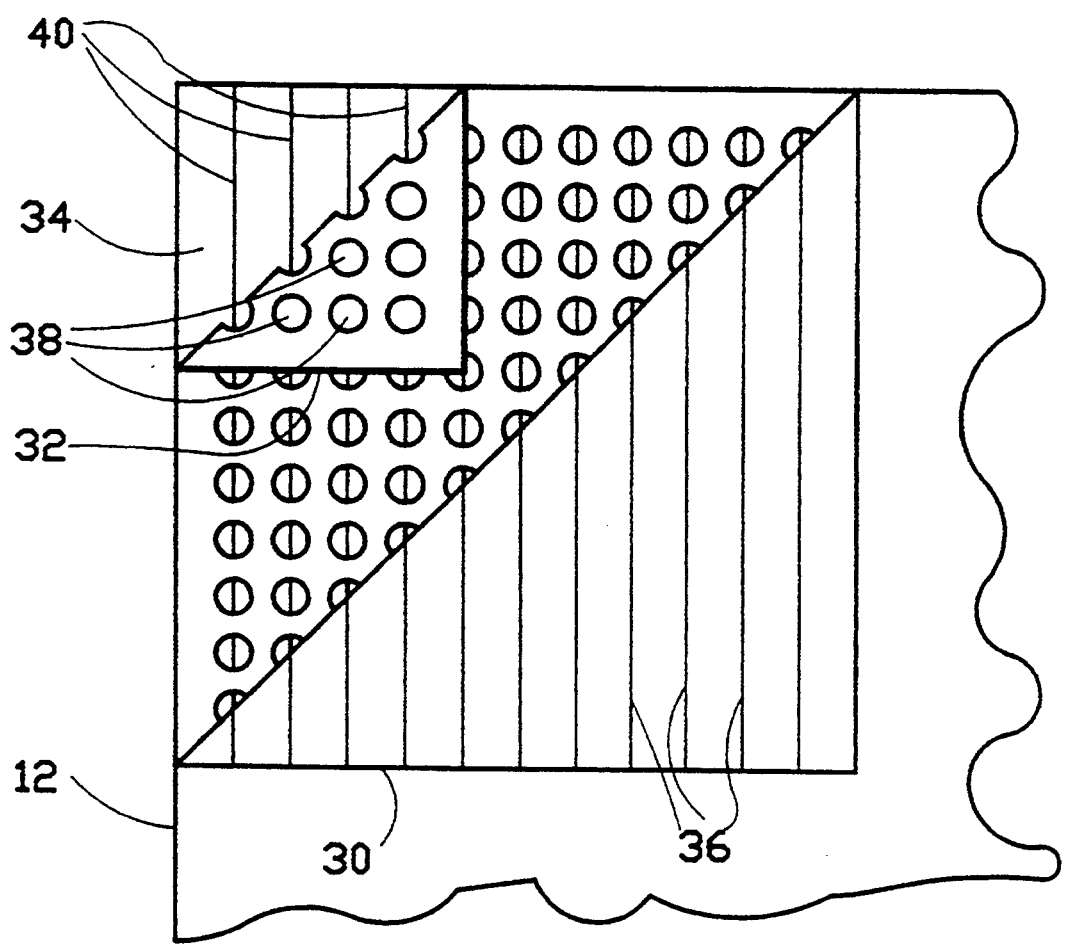
FIG. 3 is a detail showing the construction of the sensor in such a toy.

FIGS. 2 and 3 show in more detail the sensor 12. As best shown in FIG. 3 this comprises three layers, an outer layer 30, a middle layer 32 and an inner layer 34. The outer layer is of flexible synthetic plastics material such as polyvinyl sulphone and has a large number of parallel stripes 36 of conductive ink which have, for example, been silk screened onto the inwardly directed surface of the layer. The middle layer 32 is of insulating plastics material and has a large number of holes 38. Finally the inner layer 34 has a large number of parallel stripes 40 which are oriented at right angles to the stripes 36 and have been provided in a similar manner. The stripes 40 are provided on the outwardly facing surface of the layer 34.

The stripes 36 and 40 are positioned so that their crossing points correspond to the holes 38. Therefore when the feet 14 of a block 10 are placed on the outer layer 30, the weight will cause the feet to locally depress the layer 30 in the three points of contact so that the layer 30 will contact the layer 34 through respective holes in the layer 32. There will therefore be three positions where the crossing stripes 36 and 40 will be in electrical contact.

Referring to FIG. 2, one can assume that these positions are the positions A, B and C. The unit 16 therefore cycles through a check to determine these conductive points and when found their relative positions are checked with the preprogrammed member to locate the identity of a block 10 having these relative positions.

In the alternative form envisaged in the introduction to the specification, the blocks 10 may represent letters, each letter having a defined pattern of pegs. Conveniently, each letter is represented on an oblong base having a possible 9 peg positions of which several may be used to define each letter. In order to ensure that the letters are inserted into the board with the correct orientation, the pegs 14 and corresponding board sockets may have a complementary irregular shape.

Figure 4:
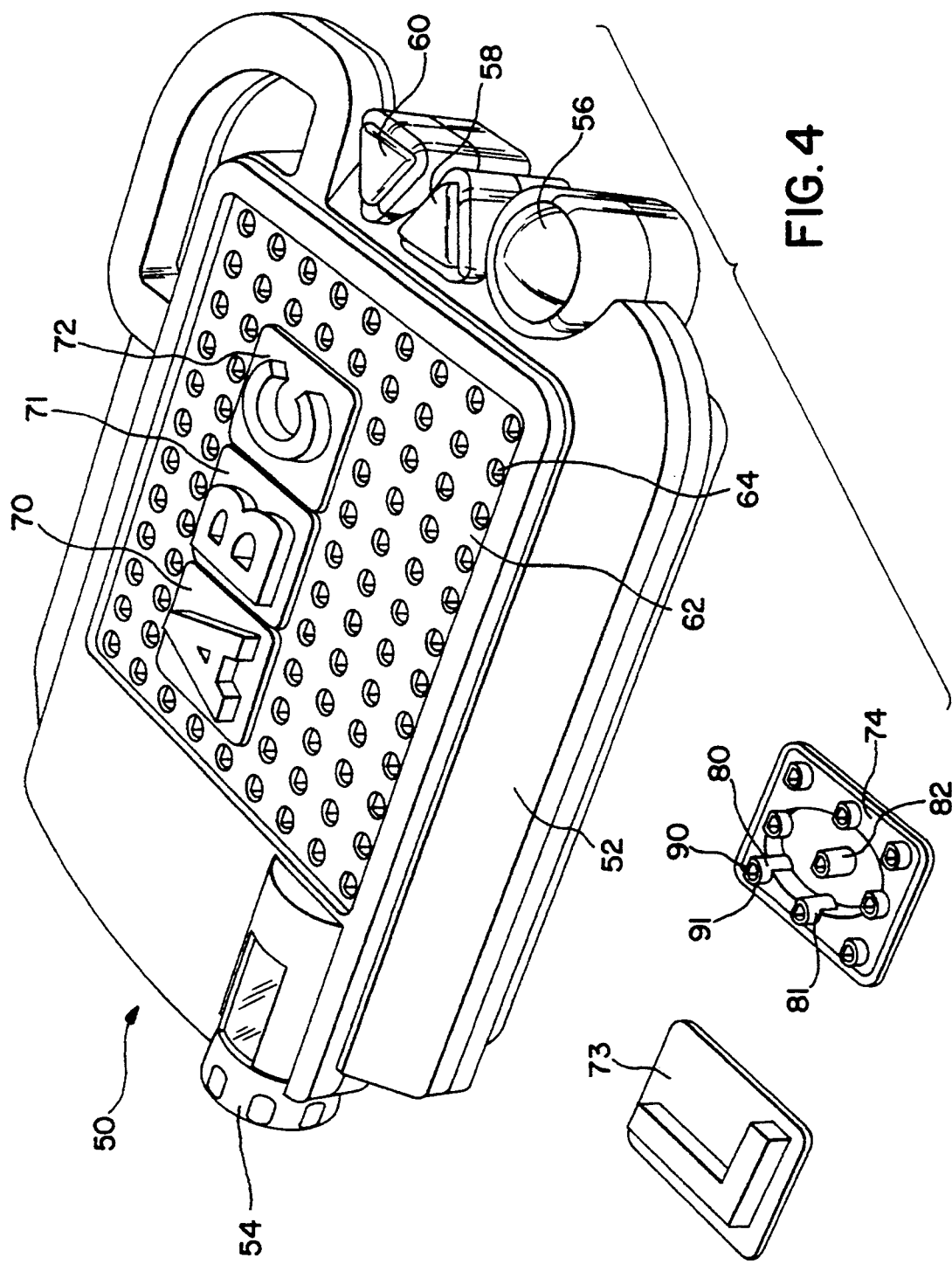
FIG. 4 is a perspective view of the embodiment of the invention.

A perspective view of the embodiment of the invention in this alternative form is shown in FIG. 4 generally designated 50, and includes a casing 52 provided with a game selector control 54 and/or selector buttons 56, 58 and 60. A board 62 is provided having an array of openings 64 corresponding to crossing points of the sensor. A plurality of tiles, for example 70-74 are provided each designating a letter. Each tile is provided with a plurality of pegs at a possible nine peg positions as shown on the underside of tile 74. Pegs 80, 81 and 82 are of sufficient height to actuate the sensor at crossing points at pre-determined relative positions and define the letter unambiguously whereas the remaining pegs are only of sufficient height to engage the board 62 and not to actuate the sensor.

Each peg may have an irregular shape having a flat side 90 and a part circular side 91, with the openings in the board having a corresponding shape thus allowing the tile only to be inserted into openings of the board in one particular orientation, for example as shown.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. An educational toy comprising a sensor having an array of sensing points and a sensor sheet having a flexible face against which an object whose shape is to be recognised is placed, the object providing a change in electrical characteristics at points of the array which are contacted by the object, output means for detecting points whose electrical characteristics have been altered, memory means for storing the relative positions of points of a set of objects, each object in the set having different stored relative positions, and for comparing the relative positions of the detected points with the stored relative positions of the set of objects to identify from the set of objects the object placed on the sensor sheet, and means for providing an output in a child recognisable manner associated with the identified object.

2. A toy as claimed in claim 1 wherein the sensor comprises first and second conductive layers each conductive layer having a plurality of independently conductive regions, each point of the array being defined by the association of one of the regions of the first layer with one of the regions of the second layer.

3. A toy as claimed in claim 2 wherein the first and second layers are spaced one from the other and are brought into electrical contact at the points where contacted by the object whose shape is to be recognised.

4. A toy as claimed in claim 3 wherein the detecting means comprises means for interrogating each point to determine if the first and second layers are in contact.

5. A toy as claimed in claim 2 wherein the conductive regions of each layer are formed as a plurality of linearly extending regions, the regions of the first layer being non-parallel to the regions of the second layer together forming a grid of intersecting regions.

6. A toy as claimed in claim 3 wherein the regions are formed by a matrix of aligned columns and rows, the columns being formed on one layer and the rows being formed on the other.

7. A toy as claimed in claim 5 wherein the conductive regions of each layer are formed by regions of conductive ink.

8. A toy as claimed in claim 2 wherein the sensor further comprises a layer of insulating plastics material disposed between the first and second conductive layers, the middle layer having a plurality of openings corresponding to said sensing points.

9. A toy as claimed in claim 1 further comprising a board having a plurality of sockets corresponding to the sensing points.

10. A toy as claimed in claim 1 wherein the object is provided with a plurality of pegs for engagement with the sensor at pre-determined relative positions.

11. A toy as claimed in claim 1 wherein the object comprises a block having a representation of a letter, the combination of pegs defining said letter.

12. A toy as claimed in claim 1 wherein the object includes a representation of a real-life object and the output means provides an audible output indicating the name of the real-life object when the object is placed on the sensing sensor.

13. A toy as claimed in claim 1 wherein the toy further comprises processing means for selecting a problem to be performed by a user associated with placing a said object from a selection of objects on the sensor and for comparing the object placed with the pre-selected object and providing a selected output in dependence upon whether the choice of object is correct or not.

14. A toy as claimed in claim 1 wherein the output means comprises a voice synthesizer for providing an oral identification of the object placed on the sensor.

15. A toy as claimed in claim 1 wherein the output means comprises a sound effect generator for providing a sound effect associated with the object placed on the sensor.

16. A toy as claimed in claim 1 wherein the placement of the object on the sensor changes the conductive characteristics of said points.

17. A toy as claimed in claim 1 wherein placement of the object on the sensor changes the capacitative characteristics of said point.

* * * * *